(12) United States Patent
Yamada et al.

(10) Patent No.: US 11,860,464 B2
(45) Date of Patent: Jan. 2, 2024

(54) OPTICAL STACK AND LIQUID CRYSTAL DISPLAY APPARATUS

(71) Applicant: SAKAI DISPLAY PRODUCTS CORPORATION, Sakai (JP)

(72) Inventors: Shintaro Yamada, Sakai (JP); Yukio Yoshida, Sakai (JP); Atsuko Maeda, Sakai (JP); Sumire Hombo, Sakai (JP); Hideki Nakagawa, Sakai (JP); Mitsuhiro Takeba, Sakai (JP); Toshihiro Yamashita, Sakai (JP); Katsumi Kondo, Sakai (JP)

(73) Assignee: SAKAI DISPLAY PRODUCTS CORPORATION, Sakai (JP)

( * ) Notice: Subject to any disclaimer, the term of this patent is extended or adjusted under 35 U.S.C. 154(b) by 217 days.

(21) Appl. No.: 17/599,487

(22) PCT Filed: Mar. 27, 2020

(86) PCT No.: PCT/JP2020/014379
§ 371 (c)(1),
(2) Date: Feb. 11, 2022

(87) PCT Pub. No.: WO2020/196898
PCT Pub. Date: Oct. 1, 2020

(65) Prior Publication Data
US 2022/0187653 A1 Jun. 16, 2022

(51) Int. Cl.
*G02F 1/1335* (2006.01)

(52) U.S. Cl.
CPC .. *G02F 1/133504* (2013.01); *G02F 1/133514* (2013.01); *G02F 1/133528* (2013.01); *G02F 2202/04* (2013.01); *G02F 2203/03* (2013.01)

(58) Field of Classification Search
CPC .............. G02F 1/133504; G02F 1/133606
See application file for complete search history.

(56) References Cited

U.S. PATENT DOCUMENTS

| | | | |
|---|---|---|---|
| 2002/0080306 A1* | 6/2002 | Takahashi | ......... G02F 1/133504 349/89 |
| 2005/0030444 A1* | 2/2005 | Fujiwara | ........... G02F 1/133615 349/64 |

(Continued)

FOREIGN PATENT DOCUMENTS

| | | |
|---|---|---|
| JP | 2003-195278 A | 7/2003 |
| JP | 2004-037706 A | 2/2004 |

(Continued)

*Primary Examiner* — Jonathan Y Jung
(74) *Attorney, Agent, or Firm* — ScienBiziP, P.C.

(57) ABSTRACT

An optical stack includes: a light scattering film converting light received at a light receiving surface into scattering light therein and then outputting the scattering light outside from a light output surface, and a sheet provided on the light output surface side of the light scattering film. The light scattering film includes: a functional layer formed of a light-transmissive composition including an organic polymer compound and light scattering particles. The functional layer includes a first surface receiving the light and a second surface from which the scattering light is output. The functional layer includes a particle layer formed of light scattering particles having a content of 60% by volume or higher among the light scattering particles, the particle layer expanding along the first surface and being concentrated in a direction perpendicular to the first surface.

14 Claims, 5 Drawing Sheets

(56) References Cited

U.S. PATENT DOCUMENTS

| | | |
|---|---|---|
| 2005/0046321 A1 | 3/2005 | Suga et al. |
| 2007/0064180 A1* | 3/2007 | Hasegawa ......... G02F 1/133504 349/112 |
| 2010/0026932 A1 | 2/2010 | Satake et al. |
| 2012/0033155 A1* | 2/2012 | Asano ................. G02B 6/0051 359/493.01 |
| 2014/0126064 A1 | 5/2014 | Kishi et al. |
| 2014/0254021 A1 | 9/2014 | Furui et al. |
| 2015/0160507 A1* | 6/2015 | Katsuta ............. G02F 1/133504 349/61 |
| 2018/0024404 A1 | 1/2018 | Suzuki et al. |

FOREIGN PATENT DOCUMENTS

| | | |
|---|---|---|
| JP | 2007-071916 A | 3/2007 |
| JP | 2008-262133 A | 10/2008 |
| JP | 2011-186008 A | 9/2011 |
| JP | 2012-103589 A | 5/2012 |
| JP | 5172524 B2 | 3/2013 |
| JP | 5323190 B2 | 10/2013 |
| JP | 2018-511073 A | 4/2018 |
| JP | 2019-020728 A | 2/2019 |
| JP | 2019-035965 A | 3/2019 |
| WO | 2013/054805 A1 | 4/2013 |

* cited by examiner

OPTICAL STACK AND LIQUID CRYSTAL DISPLAY APPARATUS

TECHNICAL FIELD

The present disclosure relates to a light scattering film and a liquid crystal display apparatus.

BACKGROUND ART

Currently, a VA (Vertical Alignment) system and an IPS (In-Plane Switching) system are widely used as display modes of liquid crystal display apparatuses. Unlike a liquid crystal display apparatus of the IPS system, a liquid crystal display apparatus of the VA system provides a display having a higher contrast ratio in a "normal-direction view" provided when the liquid crystal display apparatus is viewed from a position in a direction normal thereto (provides a higher normal contrast ratio) than in an "oblique-direction view" provided when the liquid crystal display apparatus is viewed from a position shifted from the direction normal thereto. However, the oblique-direction view has a color and a luminance that are significantly different from those of the normal-direction view. As a result, the image quality is declined.

Patent Document No. 1 discloses a liquid crystal display apparatus of the VA system in which a condensing light source is used as a backlight unit and light transmitted through a liquid crystal panel is scattered to increase the viewing angle thereof. With the technology described in Patent Document No. 1, the light from the backlight unit is condensed so as not to expand and then is incident on the liquid crystal panel. The light transmitted through the liquid crystal panel is expanded by a light diffusing layer.

The light diffusing layer is formed of a light-transmissive polymer containing scatterers. The light incident on the light diffusing layer is scattered by the scatterers. The light to be transmitted through the light diffusing layer has already been transmitted through the liquid crystal panel. Therefore, light in an oblique direction is generated in the light diffusing layer without pixels adjacent to each other in the liquid crystal panel being color-mixed with each other. As a result, a wide viewing angle may be provided.

However, such a light diffusing layer causes the following problem: external light incident on the liquid crystal panel from the viewer's side returns back to the viewer's side, and therefore, it is made difficult for a viewer to recognize the display on the screen and thus the normal contrast ratio in a bright site is decreased. In order to decrease the amount of the external light returning to the viewer's side, Patent Document No. 1 proposes incorporating a colorant into the light diffusing layer or providing a colored layer, containing a light-transmissive polymer and a colorant incorporated thereto, together with a light scattering film.

CITATION LIST

Patent Literature

Patent Document No. 1: Japanese Patent No. 5323190
Patent Document No. 2: Japanese Patent No. 5172524

SUMMARY OF INVENTION

Technical Problem

The use of the technology described in Patent Document No. 1 allows the amount of external light returning to the viewer's side at the light scattering film to be decreased. However, the light diffusing layer or the colored layer containing the colorant absorbs the external light and also absorbs the light transmitted through the liquid crystal panel, and therefore, decreases the light transmittance. As a result, there occurs a problem that the normal luminance in the normal direction is decreased.

It is known that black luminance is important for the display quality. "Black luminance" is a physical level of black color in a display, and is a sum of a reflected luminance at a display surface and a spontaneous luminance (or transmitted luminance) of the black display. So far, an influence of the black luminance on the quality of a high definition picture has been studied. Patent Document No. 1 describes that a high quality display of black color is desired. However, with the technology described in Patent Document No. 1, decrease in the normal luminance is not avoided, and therefore, it is difficult to decrease the black luminance in the normal-direction view.

In Patent Document No. 2, a unique light scattering sheet is located on an outermost surface of a polarizing film provided on the display surface side of a liquid crystal display apparatus, so that the black luminance is decreased to realize a high contrast ratio in a viewing angle wider than that realized by the conventional art. Specifically, it is described that the black luminance of a black display is caused to have a maximum value of 2.0 cd/m$^2$ at all the azimuths. However, in the case where the light scattering film disclosed by Patent Document No. 2 is used, the ratio of the black luminance in the oblique-direction view with respect to the black luminance in the normal-direction view is very high. Namely, in Patent Document No. 2, the maximum value of the black luminance is suppressed, but the black luminance in the normal-direction view and the black luminance in the oblique-direction view have a difference of a clearly recognizable level.

The present disclosure, made to solve these problems, has an object of providing a liquid crystal display apparatus that decreases the difference in the black luminance between in the normal-direction view and in the oblique-direction view to an unrecognizable level while suppressing the decrease in the black luminance in the normal-direction view.

Solution to Problem

A light scattering film according to the present disclosure converts light received at a light receiving surface into scattering light therein and then outputs the scattering light outside from a light output surface. The light scattering film includes a functional layer formed of a light-transmissive composition including an organic polymer compound and light scattering particles. The functional layer includes a first surface receiving the light and a second surface from which the scattering light is output. The light scattering particles have an average particle size of 1.5 μm or larger. The functional layer includes a particle layer formed of light scattering particles having a content of 60% by volume or higher among the light scattering particles, the particle layer expanding along the first surface and being concentrated in a direction perpendicular to the first surface.

A liquid crystal display apparatus according to the present disclosure includes a light-condensing backlight unit; a liquid crystal panel transmitting light from the backlight unit; and a light scattering film converting light received at a light receiving surface into scattering light therein and then outputting the scattering light outside from a light output surface. The light scattering film includes a functional layer formed of a light-transmissive composition including an organic polymer compound and light scattering particles. The functional layer includes a first surface receiving the light and a second surface from which the scattering light is output. The light scattering particles have an average particle size of 1.5 µm or larger. The functional layer includes a particle layer expanding along the first surface and concentrated in a direction perpendicular to the first surface. The particle layer is formed of light scattering particles having a content of 60% by volume or higher among the light scattering particles included in the functional layer. The backlight unit is structured such that light having a normalized luminance of 0.5 or higher, among the light to be incident on the liquid crystal panel, is incident at an angle of incidence in the range of 32° or smaller with respect to the liquid crystal panel. The light scattering film is structured such that the light from the backlight unit is transmitted from the first surface toward the second surface of the functional layer.

Advantageous Effects of Invention

According to one embodiment of the present disclosure, a liquid crystal display apparatus in which no difference in the black luminance is recognized between in the normal-direction view and the oblique-direction view may be provided.

BRIEF DESCRIPTION OF DRAWINGS

in FIG. 7A, the solid line represents the change in the black luminance at an azimuth of 0°, and the dashed line represents the change in the black luminance at an azimuth of 45°.

in FIG. 7B, the solid line represents the change in the black luminance at an azimuth of 0°, and the dashed line represents the change in the black luminance at an azimuth of 45°.

in FIG. 7C, line P represents one embodiment of the present disclosure, and line Q represents the comparative example.

DESCRIPTION OF EMBODIMENTS

A liquid crystal display apparatus according to an embodiment of the present disclosure will be described with reference to the drawings.

Figure 1:
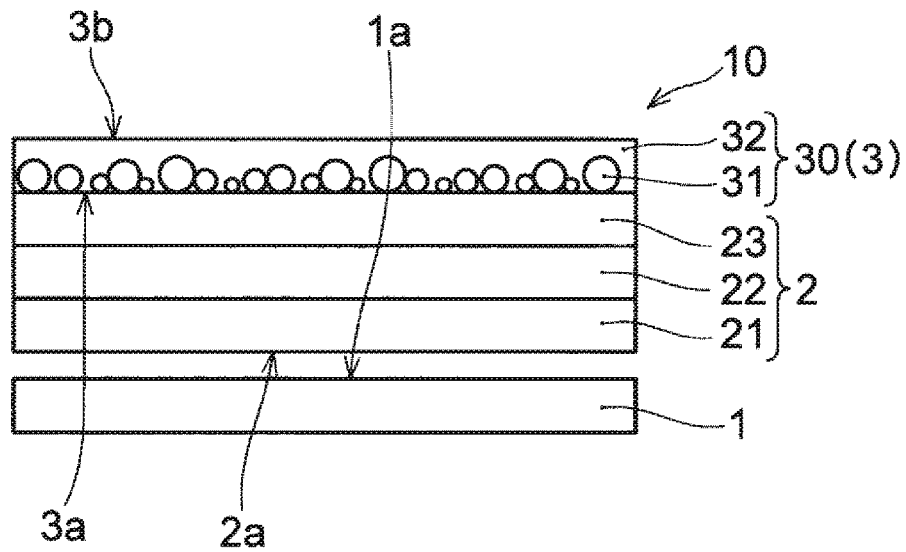
FIG. 1 shows a structure of a liquid crystal display apparatus according to an embodiment of the present disclosure.

FIG. 1 is a cross-sectional view of a liquid crystal display apparatus according to an embodiment of the present disclosure. As shown in FIG. 1, a liquid crystal display apparatus 10 according to this embodiment includes a backlight unit 1, a liquid crystal panel 2, and a light scattering film 3. These components are located such that light from the backlight unit 1 is transmitted first through the liquid crystal panel 2 and then through the light scattering film 3.

The liquid crystal panel 2 includes a liquid crystal layer 22 containing a liquid crystal composition and held between a first substrate plate 21 and a second substrate plate 23. Among these two substrate plates, a front substrate plate (closer to a viewer) is also referred to as a "CF substrate plate", and a rear substrate plate (closer to the backlight unit) is also referred to as a "TFT substrate plate".

The liquid crystal panel 2 is located such that a rear surface 2a thereof faces a light output surface 1a of the backlight unit 1 (FIG. 1) in order to allow the light from the backlight unit to be transmitted through the liquid crystal panel 2. Although simplified in FIG. 1, the liquid crystal panel 2 has a structure substantially the same as that of a common liquid crystal panel. A pair of polarizing plates (not shown) are respectively bonded to outer surfaces of the first substrate plate 21 and the second substrate plate 23. Electrodes (not shown) are respectively formed in the first substrate plate 21 and the second substrate plate 23. A director of the liquid crystal composition contained in the liquid crystal layer 22 is controlled by TFTs formed in the first substrate plate 21.

The backlight unit 1 outputs white light toward the first substrate plate 21, and the light transmitted through the first substrate plate 21 is incident on the liquid crystal layer 22 and then is transmitted through the second substrate plate 23. The liquid crystal layer 22 changes the director of the liquid crystal composition to control the transmittance for the white light from the backlight unit 1.

The director of the liquid crystal composition contained in the liquid crystal layer 22 is controlled to be generally perpendicular with respect to a display surface of the liquid crystal panel 2 in the absence of a voltage, and to be significantly inclined with respect to the display surface of the liquid crystal panel 2 in the presence of a voltage (normally black).

In this embodiment, the expression that "the director of the liquid crystal composition is generally perpendicular" encompasses a case where the director of the liquid crystal composition is oriented at a certain inclination angle (pretilt angle) with respect to a direction vertical to the substrate plates. The director of the liquid crystal composition may be oriented at a pretilt angle of 0.5° or larger and 5° or smaller with respect to the direction vertical to the substrate plates in the absence of a voltage.

Figure 3:
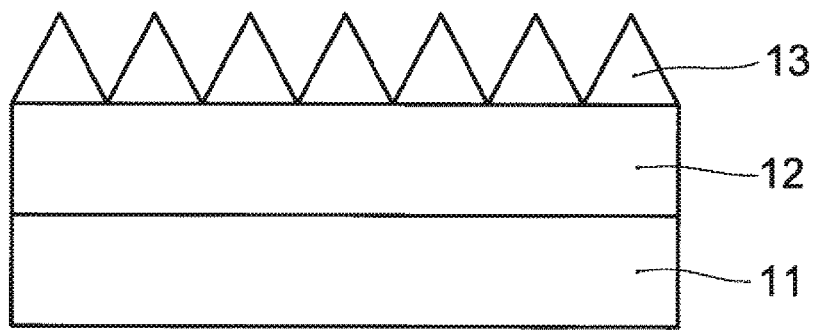
FIG. 3 shows a structure of a backlight unit used in a conventional liquid crystal display apparatus.

The backlight unit 1 is located so as to face the first substrate plate 21 of the liquid crystal panel 2, and includes the light output surface 1a, from which white light is output toward the first substrate plate 21. As shown in, for example, FIG. 3, the backlight unit 1 includes a light emitting portion 11 such as an LED, a cathode ray tube or the like, a diffusing plate 12 homogenizing light from the light emitting portion 11, and prisms 13 condensing light. In the case where the light emitting portion 11 includes a plurality of LEDs, a portion of the backlight unit 1 including an LED and a portion of the backlight unit 1 including no LED are different from each other in the luminance. In order to eliminate such a difference, the diffusing plate 12 is provided in the backlight unit 1. Light that is output from the diffusing plate 12 proceeds in an expanding path. A backlight unit having a polar angle larger than 32° at a light output surface thereof is a non-condensing light source. Therefore, in this embodiment, the prisms 13 are located on a surface of the diffusing plate 12, so that the backlight unit 1 acts as a condensing light source The backlight unit 1 is a planar light source outputting white light in a planar state. It is preferred that the backlight unit 1 is a condensing light source, by which light exhibiting a normalized luminance of 0.5 or higher (normalized luminance with the maximum luminance being 1) is detected only in a polar angle ($\theta$) range of −32° to +32° in a luminance distribution of light that is output in a direction having an azimuth $\phi$ of 0° or 180°. As can be seen, it is preferred that the backlight unit 1 condenses white light such that an optical axis thereof becomes closer to the normal to the output surface of the light source. The backlight unit 1 is structured such that among light to be incident on the liquid crystal panel 2 from the backlight unit 1, light having a normalized luminance of 0.5 or higher is incident at an angle of incidence that is preferably 32° or smaller, and more preferably 12.5° or smaller. However, the backlight unit 1 is not limited to having such a structure.

A light source by which light exhibiting a normalized luminance of 0.5 or higher is detected only in a polar angle ($\theta$) range of −32° to +32° as described above outputs almost no light that crosses the liquid crystal composition obliquely. Such a light source is referred to as a "condensing light source". A light source by which light exhibiting a normalized luminance of 0.5 or higher is detected as light having a polar angle smaller than −32° or larger than +32° is referred to as a "non-condensing light source".

Components usable for condensing light include a prism sheet, a light guide plate, a microlens sheet, a louver film and the like, but are not limited to these.

The white light may be provided by a white LED, may be provided by causing light from a blue LED to be transmitted through a fluorescent layer, or may be provided by a combination of LEDs of the three primary colors, i.e., red, green and blue LEDs.

In this specification, the term "polar angle" is intended to refer to the following. A front-rear direction of the liquid crystal display apparatus as seen from the viewer (z direction perpendicular to an xy plane defined by a left-right direction (x direction) of the liquid crystal panel and an up-down direction (y direction) of the liquid crystal panel) is used as the reference. The "polar angle" is intended to refer to an angle $\theta$ at which a vector exhibiting a state of the "oblique-direction view" is inclined toward the xy plane with respect to the reference. Namely, the direction normal to the liquid crystal panel has a polar angle of 0°.

The term "azimuth" is intended to refer to an angle $\phi$ by which an image of the vector projected on the xy plane is rotated from a positive direction of the x axis. The positive direction of the x axis has an azimuth of 0°. In the case of being referred to regarding the light source, the "azimuth" is intended to refer to a direction of the output surface of the light source provided in the liquid crystal display apparatus so as to be parallel to the liquid crystal panel.

Figure 4A:
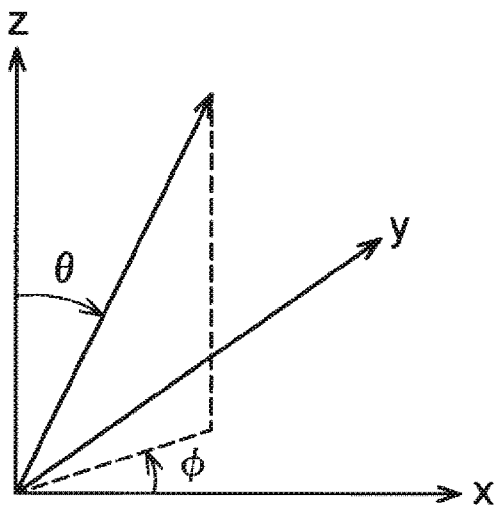
FIG. 4A shows definitions of angles (polar angle and azimuth) according to an embodiment of the present disclosure.
Figure 4B:
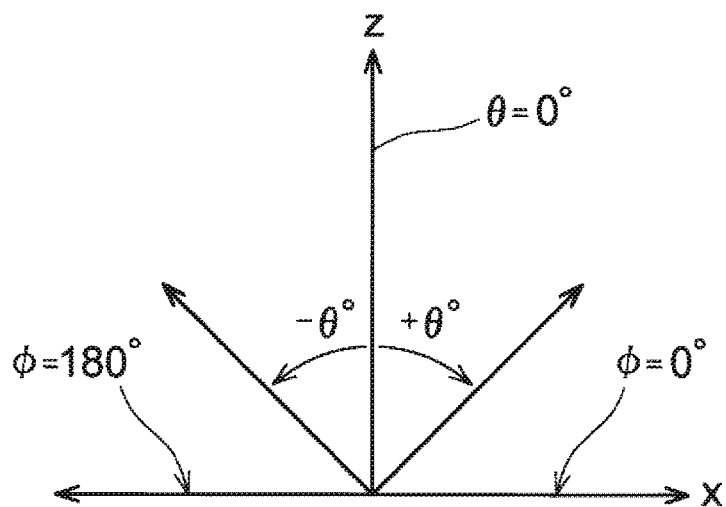
FIG. 4B shows a definition of an angle (polar angle) according to an embodiment of the present disclosure.

The polar angle and the azimuth intended in this specification are shown in FIG. 4A and FIG. 4B. Herein, the polar angle ($\theta$)=0° is used as the reference. A polar angle in the $\phi$° direction is defined as a + (positive) $\theta$, and a polar angle in the $\phi$+180° direction is defined as a − (negative) $\theta$.

The light from the backlight unit 1 is converted into linearly polarized light by a polarizing plate bonded to the first substrate plate 21 (such a polarizing plate is also referred to as a "first polarizing plate"), the direction of the linearly polarized light is controlled by the liquid crystal layer 22, and a polarizing plate bonded to the second substrate plate 23 (such a polarizing plate is also referred to as a "second polarizing plate") controls whether or not the light is to be transmitted through the second polarizing plate. In this manner, a desired display is realized. The liquid crystal layer 22 may be controlled by a TN system, a VA system, an IPS system or the like. Any system is usable. The effect of the present disclosure is especially large in the case where the VA system is used.

A liquid crystal display apparatus of the VA system has advantages of providing a high contrast ratio, a high response speed and an image with less extra coloring, and uses a liquid crystal composition having a negative dielectric anisotropy. Such a liquid crystal composition may be a mixture of a compound having a negative dielectric anisotropy and a compound having a neutral dielectric anisotropy.

An example of compound having a negative dielectric anisotropy may contain a functional group in which an atom having a large electronegativity such as an F atom or the like is provided as a substituent in a shorter axis direction of the molecule at a center of a molecular framework as shown below.

[Chemical formula 1]

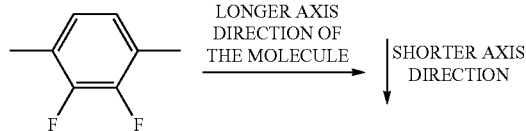

A compound having a neutral dielectric anisotropy is preferably usable in order to decrease the viscosity or to increase the liquid crystallinity at low temperature. An example of such a compound has the following structural formula.

[Chemical formula 2]

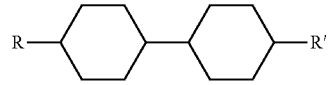

In the formula, R and R' are each —$C_nH_{2n+1}$ (alkyl group) or —O—$C_nH_{2n+1}$ (alkoxy group).

The compound shown above is merely an example of compound having a negative dielectric anisotropy. The compound usable for the liquid crystal composition according to the present disclosure is not limited to this.

In the liquid crystal display apparatus 10 according to this embodiment, the light scattering film 3 includes light scattering particles 31 scattering light and an organic polymer compound 32 containing the light scattering particles 31. After being transmitted through the liquid crystal panel 2, the light output from the backlight unit 1 is input to the inside of the light scattering film 3. The angular distribution of the light is made broader than the angular distribution of the light transmitted through the liquid crystal panel 2. Then, the light is output to the outside of the light scattering film 3 from the light output surface 3b.

The light scattering film 3 includes a light receiving surface 3a facing the second substrate plate 23 and a light output surface 3b opposite to the light receiving surface 3a. The light scattering film 3 converts the light received at the light receiving surface 3a into scattering light therein, and then outputs the scattering light outside from the light output surface 3b (toward the viewer present to the front of the liquid crystal display apparatus 10).

Figure 2A:
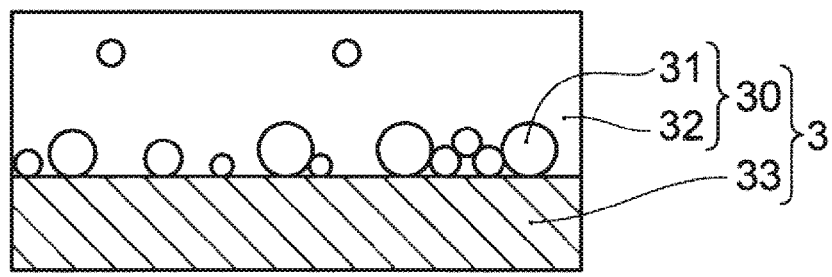
FIG. 2A is a cross-sectional view showing a light scattering film according to an embodiment of the present disclosure.
Figure 2B:
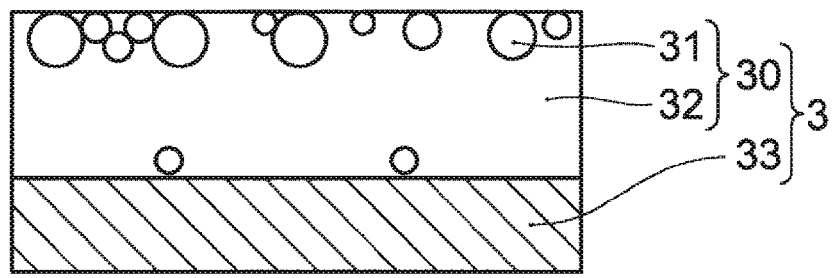
FIG. 2B is a cross-sectional view showing a light scattering film according to an embodiment of the present disclosure.

As shown in, for example, FIG. 2A and FIG. 2B, the light scattering film 3 includes a functional layer 30, which is formed of a light-transmissive compound including the light scattering particles 31 and the organic polymer compound 32 as a medium. The functional layer 30 includes a first surface receiving the light that is output from the liquid crystal panel 2 and a second surface from which isotropic scattering light generated in the functional layer 30 is released outside. These surfaces respectively correspond to the light receiving surface 3a and the light output surface 3b of the light scattering film 3 in the case where the light scattering film 3 includes no substrate.

It is preferred that the functional layer 30 includes a particle layer expanding along the first surface. The particle layer is formed of light scattering particles having a content of 60% by volume or higher among the light scattering particles included in the functional layer 30. The particle layer is concentrated in a region, of the functional layer 30, having a thickness that is 1 to 80%, preferably 10 to 80%, more preferably 30 to 80%, and still more preferably 50 to 80% of a total thickness of the functional layer 30. As can be seen, the functional layer 30 includes the particle layer in which light scattering particles have a content of 60% by volume or higher, preferably 70% by volume or higher, more preferably 80% by volume or higher and still more preferably 90% by volume or higher among the light scattering particles included in the functional layer 30 expand along the first surface and are concentrated in a direction perpendicular to the first surface.

Figure 2C:
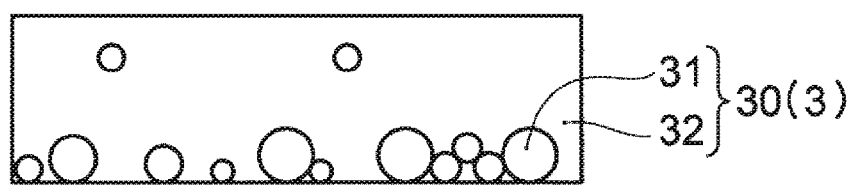
FIG. 2C is a cross-sectional view showing a light scattering film according to an embodiment of the present disclosure.

The light scattering film 3 may include a light-transmissive polymer film 33 as a substrate holding the functional layer 30 (FIG. 2A and FIG. 2B). It is known that in the case where a film including a substrate formed of a resin having birefringence such as polyethyleneterephthalate (PET) or the like is located closer to the viewer than a liquid crystal panel, rainbow-like unevenness (interference color) is caused by the birefringence, resulting in a decline in the display quality. The polymer film 33 may possibly cause interference color in an oblique direction when having high birefringence. Therefore, it is preferred that the polymer film 33 has low birefringence. It is preferred that the polymer film 33 is a zero-phase shift film, which causes no phase shift between in the x-axis direction and in the y-axis direction. An example of the polymer film 33 having such properties is a film formed of a triacetylcellulose (TAC)-based resin. The polymer film 33 is not limited to this. As shown in FIG. 2C, only the functional layer 30 may be directly bonded as the light scattering film 3 to a polarizing plate (not shown) bonded to the liquid crystal panel 2. Alternatively, as shown in FIG. 2A or FIG. 2B, the light scattering film 3 including the functional layer 30 and the polymer film 33 bonded to each other may be bonded to the above-mentioned polarizing plate. In this case, either the polymer film 33 or the functional layer 30 may be bonded to the above-mentioned polarizing plate.

As can be seen, in the case where a film having a light scattering function is located closer to the viewer than the liquid crystal panel, the above-described zero-phase shift film is preferably used as the substrate. However, such a film is difficult to handle when being large, and is costly.

According to the present disclosure, the use of a light scattering film including a functional layer having the above-described structure may suppress the rainbow-like unevenness from being caused by birefringence even in the case where the PET or the like is used for the substrate. Specifically, in the case where as shown in FIG. 1 and FIG. 2A, a functional layer according to the present disclosure is located closer to the viewer than the film having high birefringence (e.g., PET substrate), the rainbow-like unevenness caused by the birefringence may be avoided.

As described above, the light scattering film 3 has a function of scattering the incident light therein and outputting isotropic scattering light generated therein to the outside, and includes the functional layer 30 having such a function. The functional layer 30 is formed of a light-transmissive composition including the organic polymer compound 32 and the light scattering particles 31 contained in the organic polymer compound 32. The functional layer 30 is a layer that scatters light isotropically. The light scattering film 3 does not include any layer that scatters light anisotropically (anisotropic light scattering layer).

Materials usable for the light scattering particles 31 may include, for example, alumina (aluminum oxide), hollow silica, aluminum, barium sulfate, silicon oxide, titanium oxide, white lead (basic lead carbonate), zinc oxide, zinc, melamine resin, acrylic resin, polystyrene-based resin, and the like, but are not limited to these.

The organic polymer compound 32 is formed of a material having a refractive index different from that of the light scattering particles 31. Materials usable for the organic polymer compound 32 may include, for example, organic polymer compounds such as polymethylmethacrylate (PMMA), polyvinylalcohol (PVA), polyvinylchloride (PVC), polycarbonate (PC), polyethylene (PE), polystyrene (PS), polyamide (PA), silicone (SI), urea (UF), epoxy (EP), polypropylene (PP), cellulose acetate (CA), polyvinylidenechloride (PVDC), and the like, but are not limited to these.

Regarding the light scattering film 3 according to the present disclosure, the difference between the refractive index of the organic polymer compound 32 and the refractive index of the light scattering particles 31 is preferably 0.15 or larger and 1.0 or smaller, more preferably 0.15 or larger and 0.30 or smaller, and still more preferably 0.20 or larger and 0.30 or smaller. The refractive index of the organic polymer compound 32 may be larger or smaller than the refractive index of the light scattering particles 31, as long as the absolute value of the difference in the refractive index satisfies the above-described range, if the absolute value of the difference in the refractive index is too small, it is difficult to provide a wide viewing angle. If the absolute value of the difference in the refractive index is too large, it is needed to decrease the concentration of the particles or to thin the light scattering film 3.

In the case where, for example, alumina is used for the light scattering particles 31, the organic polymer compound 32 is preferably formed of PMMA, PVA, PVC, PC, PB, PP or CA, and more preferably formed of PMMA, PVA, PVC, PB, PP or CA. In the case where hollow silica is used for the light scattering particles 31, the organic polymer compound 32 is preferably formed of PMMA, PVA, PVC, PC, PB, PP or CA, and more preferably formed of PVA, PVC, PC or PB. In the case where a melamine resin is used for the light scattering particles 31, the organic polymer compound 32 is preferably formed of PMMA, PVA, PP or CA, and more preferably formed of CA.

The light scattering particles 31 have an average particle size that is preferably 1.5 μm or larger and 6.0 μm or smaller, more preferably 1.5 μm or larger and 4.5 μm or smaller, still more preferably 1.5 μm or larger and to 3.5 μm or smaller, and yet more preferably 2.0 μm or larger and 3.0 μm or smaller. The particle size of the light scattering particles 31 has a mode that is preferably 1.75 μm or larger and 3.5 μm or smaller, more preferably 1.75 μm or larger and 3.0 μm or smaller, still more preferably 2.0 μm or larger and 3.0 μm or smaller, and yet more preferably 2.25 μm or larger and 2.75 μm or smaller. The particle layer has a thickness that is preferably 1.0 to 5.0 times the above-described average particle size of the light scattering particles 31, more preferably 1.0 to 4.0 times the average particle size, and still more preferably 1.0 to 3.0 times the average particle size.

In the case where, for example, the average particle size of the light scattering particles included in the light scattering film is about 2.0 μm, the thickness of the particle layer formed in the light scattering film is preferably about 2.0 to about 10.0 μm, more preferably about 2.0 to about 8.0 μm, and still more preferably about 2.0 to about 6.0 μm.

The particle layer may be formed close to the light receiving surface 3a of the light scattering film 3 (FIG. 2A), close to the light output surface 3b of the light scattering film 3 (FIG. 2B), or far from both of the light receiving surface 3a and the light output surface 3b. In order to decrease a return of the external light (optical feedback), it is preferred that the particle layer is not in contact with the light output surface 3b.

Among the light scattering particles included in the particle layer described above, a fraction having the above-described average particle size has a content that is preferably 60% by volume or higher and 96% by volume or lower, more preferably 65% by volume or higher and 96% by volume or lower, and still more preferably 75% by volume or higher and 96% by volume or lower with respect to the entirety of the light scattering particles included in the functional layer 30. The content of this fraction may even be 80% by volume or higher and 92% by volume or lower with respect to the entirety of the light scattering particles included in the light scattering film 3.

Among the light scattering particles included in the particle layer described above, a fraction having an average particle size of 0.1 μm or larger and 1.5 μm or smaller has a content that is preferably 4% by volume or higher and 40% by volume or lower, more preferably 4% by volume or higher and 35% by volume or lower, and still more preferably 4% by volume or higher and 25% by volume or lower with respect to the entirety of the light scattering particles included in the functional layer 30. The content of this fraction may even be 8% by volume or higher and 20% by volume or lower with respect to the entirety of the light scattering particles included in the functional layer 30.

In one embodiment, light scattering particles having a content of 80% by volume or higher among the light scattering particles included in the functional layer 30 are concentrated, in a thickness direction, in a region having a thickness of 50 to 80% of the total thickness of the functional layer 30. The mode of the particle size of the concentrated light scattering particles is 1.75 μm or larger and 2.5 μm or smaller. With respect to the particles having the mode, a fraction having a particle size of 1.5 μm or larger and 3.5 μm or smaller has a content of 75% by volume or higher, and a fraction having a particle size of 0.1 μm or larger and smaller than 1.5 μm has a content of 25% by volume or lower.

In the liquid crystal display apparatus 10 according to this embodiment, it is preferred that the light scattering film 3 does not much decrease the normal luminance. It is preferred that the light scattering film 3 decreases the amount of the light returning to the viewer's side (optical feedback) among the external light from the viewer's side. It is especially preferred that the external light scattered by the light scattering particles 31 included in the light scattering film 3, as well as a reflected portion of the external light, is suppressed from returning to the viewer's side. The term "normal luminance" refers to a luminance of the display viewed at a polar angle of 0° with respect to the liquid crystal display apparatus.

In order to avoid the decrease in the normal luminance, it is preferred that light is scattered forward in a large amount and is not scattered much rearward by the light scattering film. It is known that in the case where light scattering particles having a size generally equal to, or larger than, the wavelength of the light (400 nm to 800 nm) are used, the light is scattered forward in a large amount and is not scattered much rearward. This may be easily understood from that in an example of Patent Document No. 1, microparticles having an average particle diameter of about 1 μm are used as the particles that scatter the light forward. However, the structure of the present disclosure would not have been arrived at readily by such knowledge.

The light scattering film is formed by applying a liquid organic polymer compound containing the light scattering particles to a main surface of a substrate and then drying the liquid organic polymer compound. Materials preferably usable for the substrate in the light scattering film according to the present disclosure include TAC, PET, COP and the like, but are not limited to these.

There is no specific limitation on the method for applying the organic polymer compound to the substrate, as long as a film may be formed with high precision at a desired thickness. Usable methods include, for example, gravure coating, reverse coating, knife coating, dip coating, spray coating, air knife coating, spin coating, roll coating, printing, immersion withdrawal, curtain coating, die coating, casting, bar coating, extrusion coating, E-type application, and the like.

After being dried, the light scattering film has an average thickness that is preferably 4 to 220 μm, more preferably 4 to 50 μm, and still more preferably 4 to 15 μm. If being too thin, the light scattering film does not have a sufficiently high hardness. If being too thick, the light scattering film is difficult to be processed. Therefore, an embodiment in which, for example, the post-drying thickness of the light scattering film is about 6 μm may be considered to be the best embodiment according to the present disclosure.

Based on such an amount to be applied, the light scattering film 3, after being dried, includes the light scattering particles 31 at a content that is preferably 10 to 50% by volume, and more preferably 10 to 30% by volume. In the case where the content of the light scattering particles 31 with respect to the post-drying light scattering film 3 is too low, a sufficient amount of light is not scattered by the light scattering film 3. In this case, a wide viewing angle is not provided. In the case where the content of the light scattering particles 31 with respect to the post-drying light scattering film 3 is too high, the scattering degree is increased to be unnecessarily high. As a result, the normal luminance is decreased whereas the optical feedback is increased.

In the case where the content of the light scattering particles 31 with respect to the post-drying light scattering film 3 is in the above-described range, or in the case where the light scattering film 3 has an average thickness in the above-described range, the total volume of the light scattering particles 31 included in the particle layer corresponding to 1 $m_2$ of the surface, of the post-drying light scattering film 3, that is in contact with the second substrate 23 is preferably $4.5 \times 10^{-7}$ $m^3$ to $3.6 \times 10^{-6}$ $m^3$, more preferably $6.0 \times 10^{-7}$ $m^3$ to $2.3 \times 10^{-6}$ $m^3$, and still more preferably $7.5 \times 10^{-7}$ $m^3$ to $1.5 \times 10^{-6}$ $m^3$.

When used in this specification, the term "particle" is intended to refer to a particle having a size (or dimension) of 0.1 μm or larger and 20 μm or smaller. The particles may be spherical or non-spherical. In this specification, the term "spherical" is intended to refer to a shape having a ratio smaller than 1.2 between the maximum size and the minimum size in a three-dimensional space of the particle. The term "non-spherical" is intended to refer to a shape having a ratio larger than 1.2 between the maximum size and the minimum size in the three-dimensional space of the particle. In this specification, the term "particle diameter" is used equivalently to the term "particle size". In the case of a spherical particle, the "particle diameter" is intended to refer to the diameter of the particle. In the case of a non-spherical particle, the "particle diameter" is intended to refer to the maximum size or the minimum size in the three-dimensional space of the particle.

The "particle size" is measured by the following method. First, an image of a light scattering film (inside of the light scattering film) is captured by use of a microscope in a dark viewing field in a direction normal to the surface (the light receiving surface or the light output surface) of the light scattering film. Then, the captured image is stored on a personal computer (hereinafter, referred to as a "PC"). At this point, an actual scale is also stored in the captured image. Next, outer contours of the particles in the captured image are traced by use of software installed on the PC (e.g., POWERPOINT (registered trademark) of Microsoft Corporation). In the case where the traced regions of the particles overlap each other, the positions of the regions of the particles are shifted. As a result, an object with the overlapping solved is obtained. Next, an electronic file including the above-mentioned object is read into image analysis software (e.g., ImageJ published by the National Institutes of Health, U.S.A.). As a result, the maximum size, the minimum size and the like of the object are output.

According to the present disclosure, it is preferred that the light scattering particles are light-transmissive. The size of the light scattering particles may be uniform or non-uniform, as long as a desired function is maintained. In terms of the shape, the light scattering particles may be, for example, spherical, elliptic spherical, flat plate-like, polyhedron-shaped or the like. It is most preferred that the light scattering particles are spherical.

The shape and the average particle size of the light scattering particles may be appropriately changed by controlling the stirring speed and the stirring time of a mixture containing the light scattering particles, the organic polymer compound and a solvent. In order to provide, for example, spherical particles, it is necessary to separate individual particles from each other successfully without destroying the aggregated particles. This purpose may be achieved by dispersing the particles mildly by use of a bead mill, with the kinetic energy of the beads being suppressed. The particles may be dispersed mildly by, for example, incorporating microscopic beads into the mixture or by stirring the mixture (containing the beads) at a low circumferential speed. It is more preferred to stir the mixture containing the microscopic beads at a low circumferential speed. It is more preferred to incorporate a dispersant when necessary in order to disperse solid particles into a binder solution homogeneously.

In one embodiment, a light scattering film is formed by the following steps (i) through (iv).
(i) Incorporating light scattering particles and an organic polymer compound into a solvent;
(ii) Stirring the resultant mixture to disperse the light scattering particles mildly, thereby preparing a homogeneous dispersion;
(iii) Applying the resultant dispersion to a substrate to expand the dispersion to the entirety of a surface of the substrate; and
(iv) Putting the post-application substrate into a thermostatic chamber (e.g., at 60° C. for 20 minutes).

With such a procedure, a light scatting film including a particle layer that includes spherical light scattering particles may be provided in a dry state on the substrate. For dispersing the light scattering particles, a small amount of dispersant may be incorporated into the dispersion.

In order to form the above-described particle layer (precipitation layer) successfully, it is necessary to precipitate the light scattering particles by the time when the drying of the light scattering film is finished. For this purpose, particles and a solvent with which the precipitation may be finished rapidly are appropriately selected based on the specific gravities (densities) thereof. It is preferred that an inorganic filler suppressing the precipitation (e.g., silica) is not contained in the dispersion.

The light scattering film may be dried at room temperature. In the case where the light scattering film is dried in an environment having a temperature higher than room temperature, it is preferred that the drying temperature is set to be lower than the melting point of the material of the substrate (e.g., polymer film) in order to avoid deformation of the substrate.

According to the present disclosure, a solvent having a boiling point lower than the melting point of the material of the substrate is preferably usable in order to allow the light scattering film to be dried in the above-described temperature range. In the case where PMMA is used for the substrate, solvents having a boiling point lower than the melting point of PMMA are known in the art. In the case where, for example, PMMA and an aqueous solvent are used respectively for the substrate and the solvent, the drying temperature is preferably lower than 100° C., more preferably room temperature to 80° C., and still more preferably room temperature to 60° C.

According to the present disclosure, a light scattering film including such a particle layer is used to suppress the decrease in the normal luminance and also to decrease the optical feedback. Such effects are not derived merely from the point of view of forescatter and backscatter.

As described above, the particle layer may be formed close to the light receiving surface 3a of the light scattering film 3, close to the light output surface 3b of the light scattering film 3, or far from both of the light receiving surface 3a and the light output surface 3b. The particle layer may be formed at a desired position in the light scattering film 3 as follows. The light scattering film including the concentrated particle layer is formed on the substrate so as to be as thin as possible, then is removed from the substrate, and is stacked on a polymer layer formed separately (e.g., a layer formed of an organic polymer compound to be included in the light scattering film). Alternatively, the light scattering film removed from the substrate may be attached to another member (e.g., a polarizing plate bonded to a liquid crystal panel). Still alternatively, the light scattering film may be directly formed on the polarizing plate.

The substrate used to form the light scattering film may be selected as follows. In the case where the substrate is used in the liquid crystal display apparatus as a part of the light scattering film, the substrate may be a light-transmissive polymer film. In the case where the light scattering film removed from the substrate is used in the liquid crystal display apparatus, the substrate may be a glass substrate, a metal plate or the like.

In the case where a polymer film is used as the substrate, a removing layer may be provided between the light scattering film and the substrate in order to remove the light scattering film from the substrate. A technique for separating the light scattering film from the substrate is not limited to this. In the case where a glass substrate is used as the substrate, it is preferred to use laser lift-off to remove the light scattering film from the substrate. The method for removing the light scattering film is not limited to this. Especially in the case where the light scattering film may be removed immediately after being formed on the substrate (without any other step), the force of adhesion between the light scatting film and the substrate does not need to be strong. In the case where the force of adhesion between the light scatting film and the substrate is not strong, a knife edge or the like may be used to mechanically remove the light scatting film. Such a mechanical removal procedure is usable regardless of whether the substrate is formed of glass, a metal material or a polymer film. The force of adhesion between the light scattering film and the substrate may be adjusted by, for example, adjusting the conditions under which the light scattering film is formed or by surface-treating the substrate (e.g., treating the surface of the substrate to be water-repellent).

The liquid crystal display apparatus according to the present disclosure has the above-described structure, and therefore, provides wide viewing angles (color viewing angle and luminance viewing angle). In this specification, the color viewing angle and the luminance viewing angle are defined as follows.

The color viewing angle is a difference (amount of color shift) between the color of the display viewed at a polar angle of 0° with respect to the display device (normal-direction view) and the color of the display viewed in a direction inclined with respect to the display device (polar angle θ≠0°) (oblique-direction view), and is evaluated as a color difference Δu'v'. Specifically, the color viewing angle may be evaluated as the color difference Δu'v' calculated from measurement values obtained by use of a 2D Fourier transform optical goniometer (Ezcontrast produced by ELDIM) under the conditions where no light is incident other than light from a measurement portion. According to the present disclosure, it is preferred that the color viewing angle satisfies the value (Δu'v'=0.020) obtained with reference to the document (S. Ochi, et al., "Development of Wide Viewing VA-LCD System by Utilizing Microstructure Film" IDW16, 472-475 (2016)). The polar angle thereof is ±32.5°. The color difference Δu'v' is defined by the following expression.

$$\Delta u'v' = \sqrt{(u' \text{ normal} - \text{viewing angle as viewed from } u')^2 + (v' \text{ normal} - \text{viewing angle as viewed from } v')^2} \qquad [\text{Expression 1}]$$

The luminance viewing angle is evaluated as the difference between the luminance of the display viewed at a polar angle of 0° with respect to the display device (normal-direction view) and the luminance of the display viewed in a direction inclined with respect to the display device (polar angle θ≠0°) (oblique-direction view). Specifically, the luminance viewing angle may be evaluated by measuring the angle (polar angle), of the oblique-direction view, at which a luminance that is ⅓ of the luminance measured in the normal-direction view (0°) is obtained by use of the 2D Fourier transform optical goniometer (Ezcontrast produced by ELDIM) under the conditions where no light is incident other than light from a measurement portion. According to the present disclosure, it is preferred that the luminance viewing angle is the value obtained with reference to the above-mentioned document (the above-mentioned angle exhibiting ⅓ of the luminance is ±42.5° or larger).

For example, a liquid organic polymer compound containing alumina powder (precursor of an acrylic resin) 32 is applied to have a thickness of 30 μm and dried, so that the functional layer 30 having, after being dried, a thickness of 6 μm and a particle concentration of 15 to 18% by volume is formed. In the liquid crystal display apparatus 10 according to one embodiment, the functional layer 30 having such a structure is directly bonded to the second substrate plate 23 of the liquid crystal panel 2. The liquid crystal display apparatus 10 having such a structure provides a very high normal contrast in a bright site. This liquid crystal display apparatus has a wide viewing angle.

In the case where a condensing light source is used as the backlight unit 1, almost no light output from the backlight unit 1 crosses the liquid crystal composition contained in the liquid crystal panel 2 obliquely. Therefore, the liquid crystal composition does not transmit the light at all. As a result, complete black is displayed in the normal-direction view.

The use of a light-condensing backlight unit narrows the viewing angle. However, the liquid crystal display apparatus according to the present disclosure includes the light scattering film 3, and therefore, may provide a wide viewing angle despite using a light-condensing backlight unit.

Figure 5:
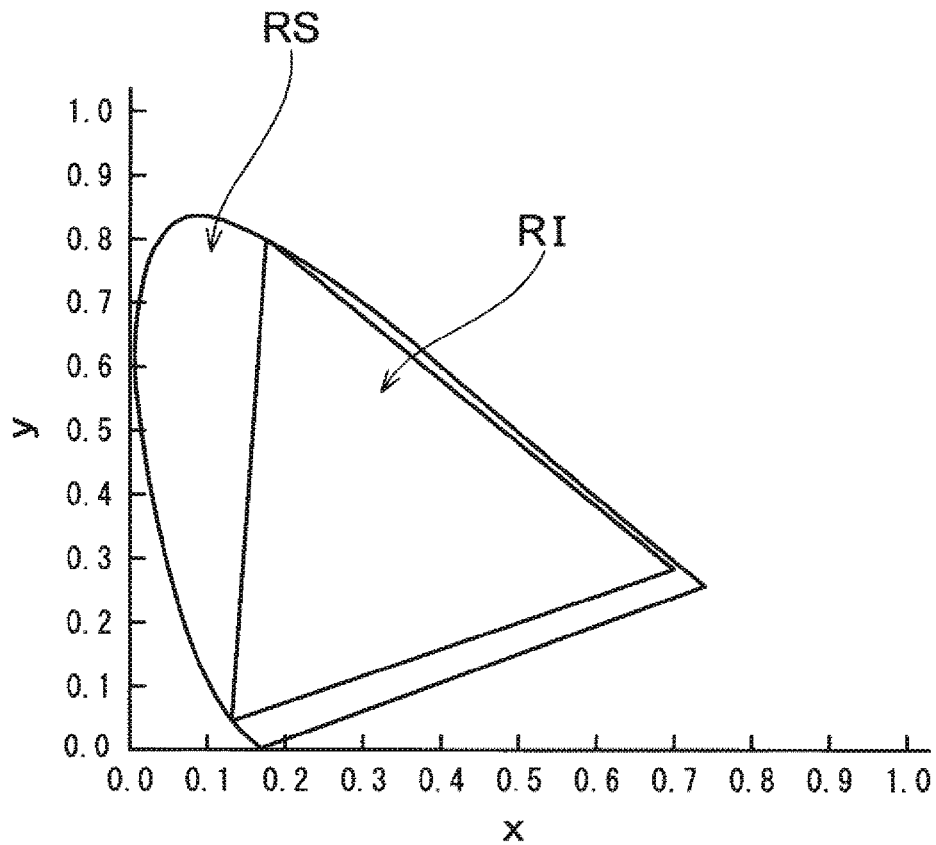
FIG. 5 is a chromaticity diagram of the CIE 1931 color space showing a color gamut defined by the standards of a liquid crystal display apparatus and a color gamut visually recognizable by a human.

In general, a liquid crystal display apparatus is desired to display an image reproducing the colors in generally the entirety of the color gamut RS recognizable by a human, such as a color region RI in the chromaticity diagram of the CIE (International Commission on Illumination) 1931 color space (FIG. 5). Such a color reproducibility is represented by an area size of an area enclosed by straight lines, connecting the coordinates of colors displayed by sub pixels of a display device, in the chromaticity diagram of the CIE 1931 color space (hereinafter, the area enclosed by the straight lines will be referred to as a "color gamut"). As the area size of such an area is larger, the display device is determined to have a higher color reproducibility. The color gamut RI is a color gamut defined by the Recommendation BT.2020 of the ITU-R (Radiocommunication Sector of the International Telecommunication Union).

The color reproducibility of an image provided by a liquid crystal display apparatus may be increased by increasing the concentration of a color filter. However, such an increase in the concentration of the color filter decreases the light transmittance of the liquid crystal panel and thus is not very practical.

The use of a quantum dot fluorescent body may significantly increase the color reproducibility of an image in the "normal-direction view" as viewed by the viewer present at a position in the direction normal to the liquid crystal display apparatus. However, in this case, the color reproducibility of the image in the "oblique-direction view" as viewed by the viewer present at a position not in the direction normal to the liquid crystal display apparatus is very low. Namely, a liquid crystal display apparatus using a quantum dot fluorescent body has a very high color purity in the normal-direction view but has a low color purity in the oblique-direction view. In the first place, the quantum dot fluorescent body is disadvantageous in terms of the cost and the environment.

The liquid crystal display apparatus according to the present disclosure uses the above-described light scattering film to provide a high color reproducibility of an image in the "normal-direction view" and also in the "oblique-direction view". Namely, in the liquid crystal display apparatus according to the present disclosure, the color reproducibility of an image in the oblique-direction view (azimuth: 0° to 180°; and polar angle: 0° to 90°) is not inferior to (is not much different from) the color reproducibility of the image in the normal-direction view.

In one embodiment, it is preferred that first light output from the light scattering film 3 in a predetermined direction (direction having a polar angle in the range of 0° to 60°) with respect to the left-right leftward direction (having an azimuth of 0° or 180°) as seen from a viewer of the liquid crystal display apparatus 10 (the first light is green light corresponding to No. 4 in the ColorChecker (Table 1 in N. Funabiki et al., IDW '08, pp. 2147-2150 (2008)) has a chromaticity that is in a chromaticity range represented by, in the chromaticity diagram (x, y) of the CIE 1931 color space, an X coordinate of 0.290 or higher and 0.295 or lower and a Y coordinate of 0.406 or higher and 0.423 or lower. In this embodiment, it is preferred that second light output from the light scattering film 3 in a predetermined direction (direction having a polar angle in the range of 0° to 60°) with respect to the left-right direction (having an azimuth of 0° or 180°) as seen from the viewer of the liquid crystal display apparatus 10 (the second light is blue light corresponding to No. 3 in the ColorChecker) has a chromaticity that is in a chromaticity range represented by, in the chromaticity diagram (x, y) of the CIE 1931 color space, an X coordinate of 0.192 or higher and 0.203 or lower and a Y coordinate of 0.135 or higher and 0.161 or lower. In this embodiment, it is preferred that third light output from the light scattering film 3 in a predetermined direction (direction having a polar angle in the range of 0° to 60°) with respect to the left-right direction (direction having an azimuth of 0° or 180°) as seen from the viewer of the liquid crystal display apparatus 10 (the third light is red light corresponding to No. 5 in the ColorChecker) has a chromaticity that is in a chromaticity range represented by, in the chromaticity diagram (x, y) of the CIE 1931 color space, an X coordinate of 0.424 or higher and 0.468 or lower and a Y coordinate of 0.294 or higher and 0.298 or lower.

In the case where the first light (green light), the second light (blue light) and the third light (red light) transmitted through the light scattering film are each in a desired chromaticity range, the color reproducibility of the image in the normal-direction view and the color reproducibility of the image in the oblique-direction view may be made less different from each other. Thus, an image having an improved color reproducibility in the oblique-direction view may be displayed.

The liquid crystal display apparatus 10 according to the present disclosure is merely required to include the backlight unit 1, the liquid crystal panel 2 and the light scattering film 3. The liquid crystal display apparatus according to the present disclosure may further include an optical filter (e.g., band cut filter) between the liquid crystal panel 2 and the light scattering film 3. Alternatively, the liquid crystal display apparatus according to the present disclosure may further include another sheet (e.g., third polarizing plate) outer to the light scattering film 3.

The another sheet is provided to the front of (closer to the viewer than) the second polarizing plate. The light scattering film 3 is provided between the second polarizing plate and the another sheet. Namely, the liquid crystal display apparatus 10 according to the present disclosure includes the another sheet, and is structured such that the light from the backlight unit 1 is transmitted through the another sheet after being transmitted through the liquid crystal panel 2 and the light scattering film 3.

In the case where the third polarizing plate is adopted as the another sheet, the first through third polarizing plates are all linear polarizers. As the third polarizing plate, a polarizing plate having a transmission axes extending in generally the same direction as that of the second polarizing plate is used. Therefore, the amount of the light detected on the viewer's side is not changed almost at all regardless of whether the third polarizing plate is present or absent. The light transmitted through the second polarizing plate is transmitted through the light scattering film 3 and then is transmitted through the third polarizing plate without decreasing the intensity thereof almost at all.

External light incident on the third polarizing plate is converted by the third polarizing plate into linearly polarized light passing the transmission axis of the third polarizing plate. Half of the incident external light is absorbed by the third polarizing plate. Therefore, half of the external light from the viewer's side is transmitted through the third polarizing plate, and the optical feedback thereof is directed toward the viewer's side.

According to the present disclosure, the above-described light scattering film is used to suppress the decrease in the normal luminance and also to decrease the optical feedback. In addition, the use of the light scattering film having such a structure allows the third polarizing plate, having a transmission axis extending in generally the same direction as the transmission axis of the second polarizing plate, to be located to the front of the light output surface 3b of the light scattering film 3. Thus, the optical feedback is suppressed with almost no decrease in the normal luminance. Such effects are not derived merely from the point of view of forescatter and backscatter.

As can be seen, it is highly preferred that the light scattering film 3 according to the present disclosure is used in combination with the third polarizing plate. In the case where the light scattering film 3 is used in combination with the polarizing plate including a dye layer formed of a dichroic dye, the dye layer of the third polarizing plate is bonded to the light output surface 3b of the light scattering film 3. In this case, it is preferred that the light scattering film 3 is formed of the functional layer 30. Namely, it is preferred that the light scattering film formed of the functional layer is directly bonded to the dye layer of the third polarizing plate. With such a structure, a substrate of PET or the like is not present between the second polarizing plate and the dye layer of the third polarizing plate. Therefore, the possibility that a multi-layer film including the light scattering film 3 and the third polarizing plate bonded to each other is warped is significantly decreased. Such an effect of decreasing the warp is not described or suggested in any of the above-mentioned documents.

Even in the case where the light scattering film 3 includes the substrate 33, the amount of the substrate present between the second polarizing plate and the third polarizing plate may be decreased as long as the substrate 33 is combined with a polarizing plate including a dye layer formed of a dichroic dye. Therefore, the warp of the multi-layer film, which may be caused by the property of the substrate of absorbing moisture, may be decreased. Therefore, there is no specific limitation on the type of the resin to be used for the resin sheet. The resin sheet may be formed of, for example, TAC or PET.

In order to decrease blur of the display caused by a light diffuser located closer to the viewer than the liquid crystal panel, it is also known to provide, as such a light diffuser, a component that scatters light anisotropically (e.g., Japanese Laid-Open Patent Publication No. 2007-71916). The technology disclosed by this document indispensably requires a light diffuser having three-dimensional anisotropy as a light diffusion characteristic.

By contrast, the liquid crystal display apparatus 10 does not include a component scattering light anisotropically at a position closer to the viewer than the liquid crystal panel. Needless to say, the light scattering film 3 according to this embodiment does not include an anisotropic light scattering layer. Such a structure is not described or suggested in any of the above-described documents.

The third polarizing plate may have a protective layer provided on a front surface thereof (surface closer to the viewer). The protective layer is formed as a protective film of the polarizing plate, and may be formed of a cellulose-based resin such as triacetylcellulose (TAC) or the like; a transparent resin such as polyester-based resin, polyvinyl-alcohol-based resin, polycarbonate-based resin, polyamide-based resin, polyimide-based resin, polyethersulfone-based resin, polysulfone-based resin, polystyrene-based resin, polynorbornene-based resin, polyolefin-based resin, (meth)acrylic resin, acetate-based resin, or the like; a thermosetting or ultraviolet-curable resin such as (meth)acrylic resin, urethane-based resin, (meth)acrylurethane-based resin, epoxy-based resin, silicone-based resin, or the like; etc.

The protective layer may be subjected to surface treatment such as hard-coat treatment, anti-reflection treatment, anti-sticking treatment, anti-glare treatment, or the like when necessary.

The another sheet may be a sheet that may be bonded to a light scattering film from the viewer's side. For example, the protective layer having the above-described structure may be used as the another sheet. In this case, the protective layer may be a layer directly bonded to the front surface of the light scattering film without the third protective plate being provided between the protective layer and the first surface, or may be a layer coating the front surface. Alternatively, the another sheet may be a transmitted light selecting layer preventing the transmission of light in a specific wavelength region contained in the light from the liquid crystal panel. Such a transmitted light selecting layer includes a resin as a matrix and a transmitted light selecting agent dispersed in the matrix. The transmitted light selecting layer may be formed by a procedure similar to the procedure for forming the light scattering film.

The resin usable for the transmitted light selecting layer may be a thermoplastic resin, a thermosetting resin, or a photocurable resin. Examples of the usable resin include epoxy, (meth)acrylate (e.g., methylmethacrylate, butylacrylate), norbornene, polyethylene, poly(vinylbutyral), poly(vinylacetate), polyurea, polyurethane, aminosilicone (AMS), polyphenylmethylsiloxane, polyphenylalkylsiloxane, polydiphenylsiloxane, polydialkylsiloxane, silsesquioxane, silicone fluoride, vinyl-and-hydride-substituted silicone, styrene-based polymer (e.g., polystyrene, aminopolystyrene (APS), poly(acrylonitrile ethylene styrene (AES)), polymer crosslinked with a bifunctional monomer (e.g., divinylbenzene), polyester-based polymer (e.g., polyethyleneterephthalate), cellulose-based polymer (e.g., triacetylcellulose), vinylchloride-based polymer, amide-based polymer, imide-based polymer, vinylalcohol-based polymer, epoxy-based polymer, silicone-based polymer, and acrylurethane-based polymer. These resins may be used independently or may be used in combination (e.g., blended or copolymerized). These resins may be treated, for example, stretched, heated or pressurized after being formed into a film.

In one embodiment, the resin used for the transmitted light selecting layer is different from the resin used for the organic polymer compound included in the light scattering film (functional layer).

The resin used for the transmitted light selecting layer may be pressure-sensitive adhesive. Namely, the transmitted light selecting layer as the another sheet may be a pressure-sensitive adhesive layer, and may be, for example, a pressure-sensitive adhesive layer usable to bond the protective layer or the like to the front surface of the polarizing plate or the light scattering layer. The pressure-sensitive adhesive layer may include a pressure-sensitive adhesive and a transmitted light selecting agent dispersed in the pressure-sensitive adhesive. Examples of the usable pressure-sensitive adhesive include a rubber-based pressure-sensitive adhesive, an acrylic pressure-sensitive adhesive, a silicone-based pressure-sensitive adhesive, an epoxy-based pressure-sensitive adhesive, and a cellulose-based pressure-sensitive adhesive. It is preferred to use a rubber-based pressure-sensitive adhesive or an acrylic pressure-sensitive adhesive.

It is preferred that the transmitted light selecting agent usable for the transmitted light selecting layer is a dye selectively absorbing light having a specific wavelength. Examples of the usable dye include anthraquinone-based, triphenylmethane-based, naphthoquinone-based, perinone-based, pelylene-based, squarylium-based, cyanine-based, porphyrin-based, azaporphyrin-based, phthalocyanine-based, subphthaiocyanine-based, quinizarin-based, polyraethine-based, rhodaraine-based, oxonol-based, quinone-based, azo-based, xanthene-based, azoraethine-based, quinacridone-based, dioxazine-based, diketo-pyrrolo-pyrrole-based, anthrapyridone-based, isoindolinone-based, indanthrone-based, indigo-based, thioindigo-based, quinophthalone-based, quinoline-based, and triphenylmethane-based compounds.

The dye may be used independently or in a combination of two or more types. In the case where a dye is used independently, it is preferred to use a dye having a wavelength of maximum absorbance in the wavelength range of 570 nm to 610 nm (e.g., squarylium-based, cyanine-based, porphyrin-based, rhodamine-based, quinacridone-based or indigo-based compound).

The transmitted light selecting layer contains such a dye and therefore, prevents the transmission of light in a wavelength range between the wavelength of green light and the wavelength of red light. Such a wavelength range includes at least a wavelength range of 580 nm to 585 nm, and is, for example, a wavelength range of 550 nm to 600 nm or 550 nm to 615 nm.

According to this embodiment, the transmitted light selecting layer further prevents the transmission of light in at least the wavelength range of 580 nm to 585 nm. As a result, the transmission of yellow light between the green light and the red light is prevented. Therefore, green light and red light having a narrowed spectrum may be provided. This improves the color reproducibility of the display using the green light or the red light.

In the case where such a transmitted light selecting layer is used in combination with the component according to the present disclosure, the optical feedback may be effectively suppressed even in the case where the concentration of the dye is low. As can be seen, it is also highly preferred to use the light scattering film according to the present disclosure in combination with the transmitted light selecting layer. Specifically, it has been confirmed that in the case where the transmitted light selecting layer containing a dye in an amount of 0.0105 g (having an absorbance of 0.0133 at a wavelength of 530 nm) per 1 $m^2$ is used in the structure of the present disclosure, the optical feedback is sufficiently suppressed. Even in the case where the amount of the dye is decreased to half, the effect of decreasing the optical feedback is not influenced almost at all.

In the case where two or more types of dyes are used in combination, it is preferred to combine dyes having a wavelength of maximum absorbance in the wavelength range of 470 nm to 500 nm (e.g., anthraquinone-based, oxime-based, naphthoquinone-based, quinizarin-based, oxonol-based, azo-based, xanthene-based, and phthalocyanine-based compounds).

The transmitted light selecting layer further contains such a dye and therefore, prevents the transmission of light in a wavelength range between the wavelength of green light and the wavelength of blue light. Such a wavelength range includes at least a wavelength range of 495 nm to 500 nm, and is, for example, a wavelength range of 475 nm to 500 nm or 480 nm to 510 nm.

According to this embodiment, the transmitted light selecting layer further prevents the transmission of light in at least the wavelength range of 495 nm to 500 nm. As a result, the transmission of light between the green light and the blue light is prevented. Therefore, green light and blue light having a narrowed spectrum may be provided. This improves the color reproducibility of the display using the green light or the blue light.

EXAMPLES

Examples of the liquid crystal display apparatus according to one embodiment of the present disclosure will be described. The present disclosure is not limited to the following examples.

Example 1

A liquid crystal display apparatus including a backlight unit used in a commercially available display apparatus (PN-V701 (produced by Sharp Corporation)), a liquid crystal panel used in a commercially available display apparatus (4T-C60AJ1 (produced by Sharp Corporation)), and a light scattering film (thickness: 5.7 µm; light scattering particles: alumina having an average particle size of 1.94 µm) was produced, in which the backlight unit, the liquid crystal panel and the light scattering film were located as shown in FIG. 1. The display mode of this liquid crystal display apparatus was the VA system. The chromaticity of light of each of the three colors, i.e., blue light, green light and red light respectively corresponding to No. 3 through No. 5 of the ColorChecker, among light components transmitted through the light scattering film, was measured by use of a spectrocolorimeter (SR-LEDW produced by TOPCON Corporation).

The light scattering film was prepared as follows. 35 g of alumina particles ("*Pyrococcus*" 2 µm produced by Baikowski, Japan) and 88 g of acrylic resin (Voncoat CF-8700 produced by DIG Corporation) were incorporated into 149 g of water together with a trace amount of dispersant. The resultant mixture was stirred to disperse the alumina particles mildly, resulting in preparation of an emulsion containing alumina dispersed homogeneously. 3 g of the emulsion containing alumina dispersed therein was put on a highly adhesive surface (300 $cm^2$) of a PET film (Lumirror T60 produced by Toray Industries, Inc.) and was expanded onto the entirety of the surface by use of a 0.67 mil applicator. The PET film having the emulsion applied thereto was kept in a thermostat chamber (DRA630DB produced by Advantec Toyo Kaisha Ltd.) at 60° C. for 20 minutes. As a result, the light scattering film was obtained in a dry state on the PET film.

Figure 6A:
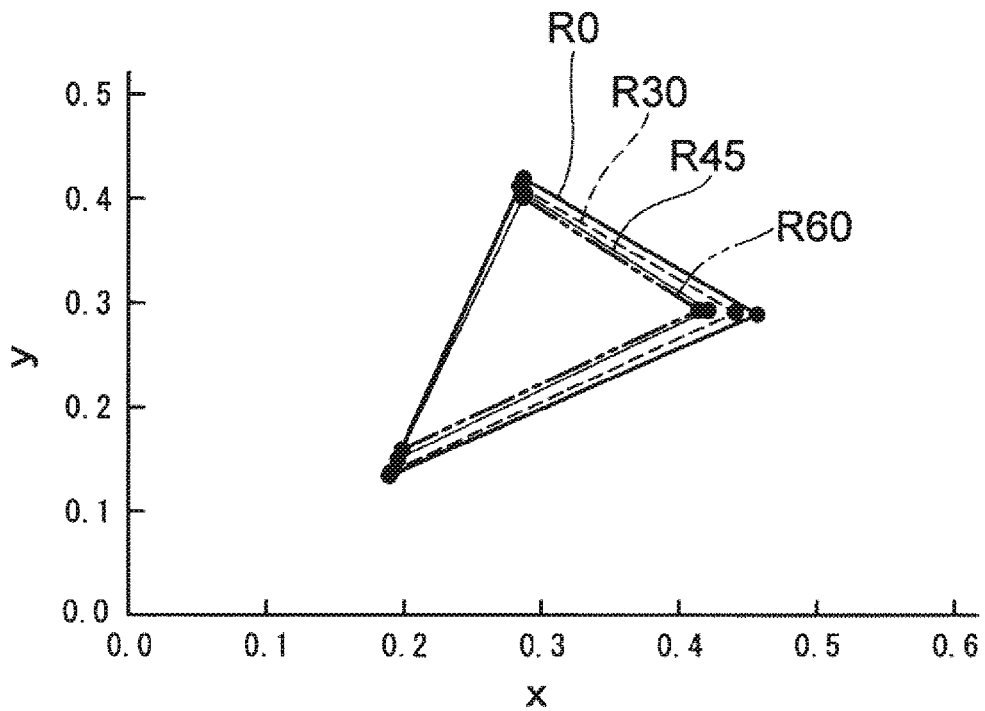
FIG. 6A is a graph showing a difference among color gamuts, of a liquid crystal display apparatus according to one embodiment of the present disclosure, caused in an oblique-direction view.

FIG. 6A shows the chromaticity of each of three points of the red light, the green light and the blue light as light transmitted through corresponding sub pixels at a constant azimuth (0 or 180°) and a polar angle in the range of 0° to 60°. The azimuth is with respect to the left-right direction of the liquid crystal display apparatus as seen from the viewer, and the polar angle is with respect to the direction normal to the liquid crystal display apparatus. The chromaticity is represented by chromaticity coordinates in the chromaticity diagram (x, y) of the CIE 1931 color space.

In FIG. 6A, the chromaticity coordinates of each of the apexes of the four triangles represent the chromaticity of the transmitted light. The triangles respectively represent a color gamut R0 (in the case of a polar angle of 0°), a color gamut R30 (in the case of a polar angle of 30°), a color gamut R45 (in the case of a polar angle of 45°) and a color gamut R60 (in the case of a polar angle of 60°). The chromaticity coordinates of the apexes of the triangle of the color gamut R0 are respectively (0.19, 0.13), (0.29, 0.42) and (0.47, 0.29). The chromaticity coordinates of the apexes of the triangle of the color gamut R30 are respectively (0.20, 0.14), (0.29, 0.42) and (0.45, 0.29). The chromaticity coordinates of the apexes of the triangle of the color gamut R45 are respectively (0.20, 0.15), (0.30, 0.41) and (0.43, 0.30). The chromaticity coordinates of the apexes of the triangle of the color gamut R60 are respectively (0.20, 0.16), (0.29, 0.41) and (0.42, 0.30).

The luminance of light already transmitted through the liquid crystal panel was normalized with respect to the maximum luminance thereof (luminance at a polar angle of 0°) of 1. Light having such a luminance (normalized luminance) of 0.5 or higher had a polar angle (absolute value)

having a maximum value of 11.9°, which was in the range of 0° or larger and 32° or smaller.

Comparative Example

Figure 6B:
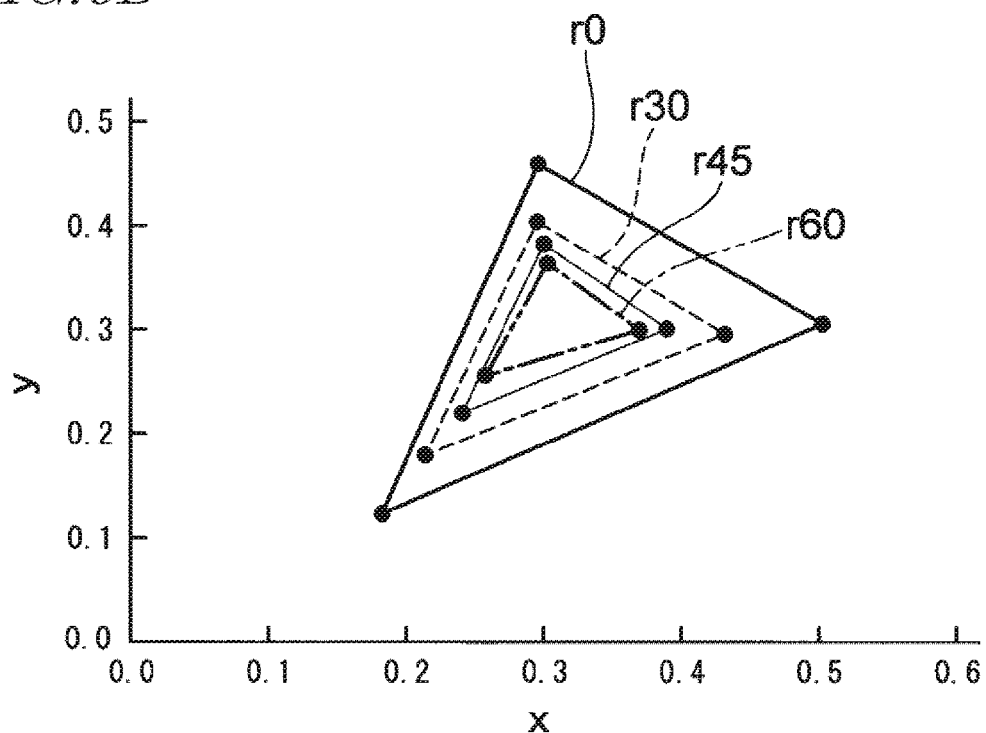
FIG. 6B is a graph showing a difference among color gamuts, of a liquid crystal display apparatus in a comparative example, caused in an oblique-direction view.

Three diffusing sheets were inserted into a light output surface of the same backlight unit as used in example 1 to produce a non-condensing backlight unit. A liquid crystal display apparatus including the non-condensing backlight unit and the same liquid crystal panel as used in example 1 was used, in which the backlight unit and the liquid crystal panel were located as shown in FIG. 1. The chromaticity of light of each of the three colors, i.e., blue light, green light and red light respectively corresponding to No. 3 through No. 5 of the ColorChecker, among light components transmitted through the light scattering film, was measured by use of the spectrocolorimeter (SR-LEDW produced by TOPCON Corporation). FIG. 6B shows the chromaticity of each of three points of the red light, the green light and the blue light as light transmitted through corresponding sub pixels at a constant azimuth (0 or 180°) and a polar angle in the range of 0° to 60°. The azimuth is with respect to the left-right direction of the liquid crystal display apparatus as seen from the viewer, and the polar angle is with respect to the direction normal to the liquid crystal display apparatus. The chromaticity is represented by chromaticity coordinates in the chromaticity diagram (x, y) of the CIE 1931 color space.

In FIG. 6B, the chroraaticity coordinates of each of the apexes of the four triangles represent the chroraaticity of the transmitted light. The triangles respectively represent a color gamut r0 (in the case of a polar angle of 0°), a color gamut r30 (in the case of a polar angle of 30°), a color gamut r45 (in the case of a polar angle of 45°) and a color gamut r60 (in the case of a polar angle of 60°). The chromaticity coordinates of the apexes of the triangle of the color gamut r0 are respectively (0.18, 0.12), (0.29, 0.46) and (0.50, 0.31). The chromaticity coordinates of the apexes of the triangle of the color gamut r30 are respectively (0.21, 0.18), (0.30, 0.41) and (0.43, 0.30). The chromaticity coordinates of the apexes of the triangle of the color gamut r45 are respectively (0.2, 0.22), (0.30, 0.38) and (0.39, 0.30). The chromaticity coordinates of the apexes of the triangle of the color gamut r60 are respectively (0.26, 0.26), (0.30, 0.36) and (0.37, 0.30). The luminance of light already transmitted through the liquid crystal panel (light to be received by the light scattering film) was normalized. Light having such a luminance (normalized luminance) of 0.5 or higher had a polar angle (absolute value) having a maximum value of 33.5°, which was outside the range of 0° or larger and 32° or smaller.

It has been found out that the liquid crystal display apparatus including the condensing light source and the light scattering film significantly improves the color gamut of a displayed image and may display color gamut of generally the same level as the color gamut RI defined by the Recommendation BT.2020 of the ITU-R. In addition, it has been found out that the liquid crystal display apparatus has a wide color viewing angle and does not change the color gamut almost at all even in the case where the polar angle is increased. By contrast, the liquid crystal display apparatus using the non-condensing light source has a narrow color viewing angle and narrows the color gamut of the displayed image as the polar angle is increased.

TABLE 1

| POLAR ANGLE (°) | AREA SIZE RATIO (%) ((AREA SIZE OF THE COLOR AREA AT EACH POLAR ANGLE/AREA SIZE OF THE COLOR AREA AT POLAR ANGLE OF 0°) × 100) | |
|---|---|---|
| | EXAMPLE 1 | COMPARATIVE EXAMPLE 1 |
| 0 | 100.0 | 100.0 |
| 30 | 87.4 | 45.0 |
| 45 | 71.5 | 22.1 |
| 60 | 66.0 | 11.6 |

The changes in the color gamut, in the chromaticity diagram (x, y) shown in FIG. 6A and FIG. 6B, caused by the change in the polar angle are represented by numerical values (Table 1). The area size ratio of each of the color gamut R0 (FIG. 6A) and the color gamut r0 (FIG. 6B) in the case where the polar angle is 0° is set as 100%. In the liquid crystal display apparatus using the non-condensing light source, when the polar angle is 60°, the area size ratio of the color gamut r0 is decreased to about 10%. By contrast, in the liquid crystal display apparatus using the condensing light source and the light scattering film, when the polar angle is 60°, the area size ratio of the color gamut R0 is maintained at 60% or higher. As can be seen, the use of the condensing light source and the light scattering film realizes a liquid crystal display apparatus in which the color purity in the oblique-direction view is not much decreased from the color purity in the normal-direction view, and the color reproducibility is high both in the normal-direction view and the oblique-direction view.

In the above example, the azimuth is 0° or 180°. The effects of this embodiment are provided even in the case where the azimuth is 0° to 90° or 90° to 180° (no data is provided).

It has been found out that the liquid crystal display apparatus using the condensing light source and the light scattering film has a luminance distribution that is narrower by a certain degree than that of the liquid crystal display apparatus using the non-condensing light source, but that the change in the luminance caused in the oblique-direction view is in a permissible range (range of the luminance change required for a liquid crystal display apparatus).

Example 2

In a liquid crystal display apparatus having a display mode of the VA system, the color and the black luminance in the "oblique-direction view" are significantly changed from the color and the black luminance in the normal-direction view. As a result, the image quality is declined. The viewing angle characteristics are especially poor when the azimuth is 45°. Thus, the viewing angle characteristics of the liquid crystal display apparatus according to the present disclosure were examined.

The liquid crystal display apparatus produced in example 1 was used. In the light scattering film, the particle layer parallel to the liquid crystal panel contains, as light scattering particles, alumina particles having a volume of $9.0 \times 10^{-7}$ $cm^3$ per 1 $m^2$-plane. The black luminance was measured while the polar angle was changed from −90° to +90° when the azimuth with respect to the rightward direction of the liquid crystal panel as viewed from the viewer present in the direction normal to the liquid crystal display apparatus was 0° or 45°.

It is ergonomically known that in the case where a target luminance is at least 0.5 times and at most 2.0 times the reference luminance (normal luminance), the difference between these types of luminance is not recognized. As can be seen, in the case where among two types of luminance to be compared, one luminance is at least 0.5 times and at most 2.0 times the other luminance, these types of luminance are determined to be the same as each other.

Figure 7A:
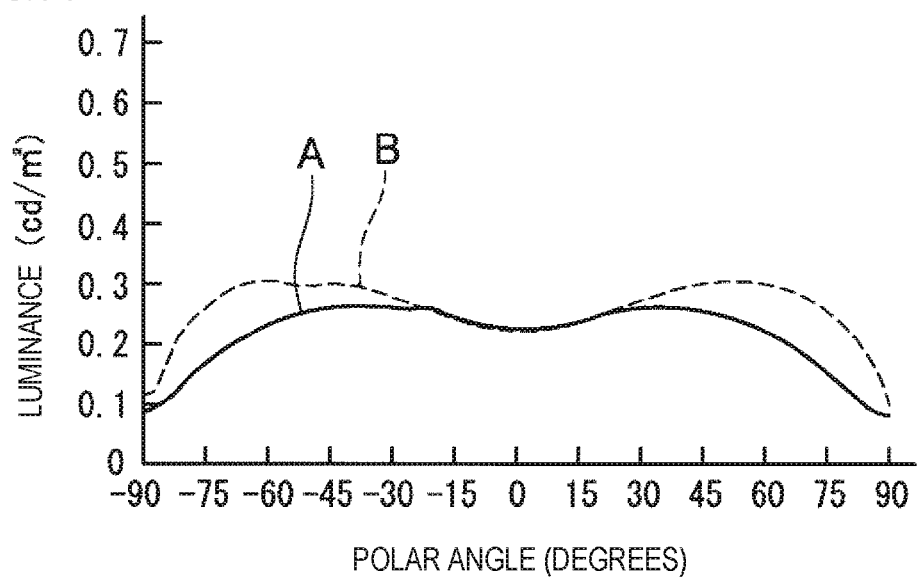
FIG. 7A shows changes in the black luminance, caused by a change in the polar angle, of light that is output from a liquid crystal panel according to one embodiment of the present disclosure.

FIG. 7A shows changes in the black luminance caused by a change in the polar angle of light that is output from the liquid crystal panel in a liquid crystal display apparatus using a combination of the light-condensing backlight unit and the light scattering film. The solid line A represents the change in the black luminance at an azimuth of 0°, and the dashed line B represents the change in the black luminance at an azimuth of 45°. In the liquid crystal display apparatus using a combination of the light-condensing backlight unit and the light scattering film, the black luminance is constant when the azimuth is 0° and when the azimuth is 45° (Table 2).

Figure 7B:
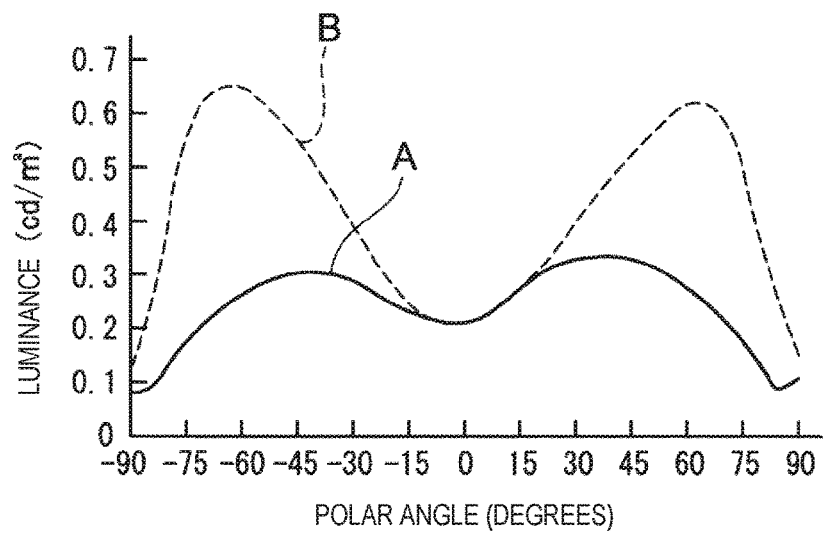
FIG. 7B shows changes in the black luminance, caused by a change in the polar angle, of light that is output from a liquid crystal panel in the comparative example.

The black luminance was measured in substantially the same manner as for the liquid crystal display apparatus without the light scattering film 3. FIG. 7B shows changes in the black luminance caused by a change in the polar angle of light that is output from the liquid crystal panel in a liquid crystal display apparatus without the light scattering film 3 provided in a comparative example. The solid line A represents the change in the black luminance at an azimuth of 0°, and the dashed line B represents the change in the black luminance at an azimuth of 45°. When the azimuth is 45°, the black luminance is significantly changed from the black luminance when the azimuth is 0° (Table 2). In a liquid crystal display apparatus of the IPS system, the black luminance in the normal-direction view is significantly different from the black luminance in the oblique-direction view when the azimuth is 45° (no data is provided).

TABLE 2

| | BLACK LUMINANCE (CD/M$^2$) | | | |
|---|---|---|---|---|
| | AZIMUTH 0° | | AZIMUTH 45° | |
| | NORMAL-DIRECTION VIEW (POLAR ANGLE: 0°) | OBLIQUE-DIRECTION VIEW (POLAR ANGLE: 45°) | NORMAL-DIRECTION VIEW (POLAR ANGLE: 0°) | OBLIQUE-DIRECTION VIEW (POLAR ANGLE: 45°) |
| EXAMPLE | 0.23 | 0.26 | 0.23 | 0.3 |
| COMPARATIVE EXAMPLE | 0.22 | 0.34 | 0.22 | 0.61 |

Figure 7C:
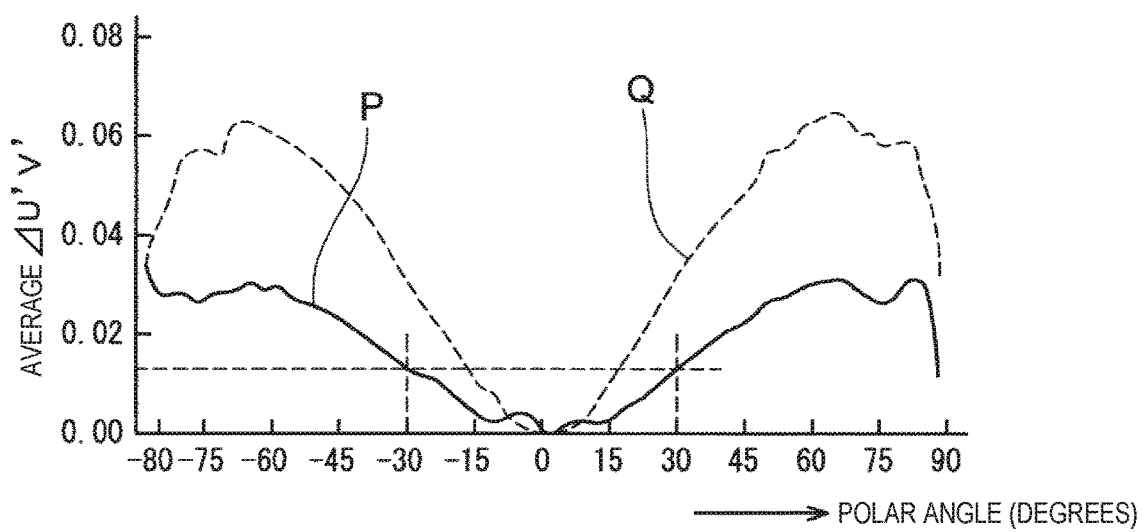
FIG. 7C shows changes in the color caused by a change in the polar angle of light that is output from the liquid crystal panels.

Even in the case of color display, almost no light crosses the liquid crystal composition contained in the liquid crystal panel 2 obliquely. Therefore, the color change is suppressed. This is clear from that when the angle of incidence (polar angle) of the light from the backlight unit on the liquid crystal panel is −32° or larger and 32° or smaller, the color change (Δu'v') is smaller than 0.02 (FIG. 7C). FIG. 7C shows color changes of the light output from the liquid crystal panel caused by a change in the polar angle. In the figure, line P represents one embodiment of the present disclosure, and line Q represents the comparative example.

As can be seen, the use of the light-condensing backlight unit and the light scattering film in combination may suppress the change in the black luminance and the color change. Namely, any backlight unit is usable that condenses the light transmitted through the liquid crystal composition contained in the liquid crystal panel 2 to such a degree that neither the black luminance nor the color is changed. The present inventors have confirmed that the influence of light crossing the liquid crystal composition contained in the liquid crystal panel obliquely is eliminated as long as the angle of incidence of the light from the backlight unit on the liquid crystal panel is in the range of −32° to +32°.

Summary

A liquid crystal display apparatus according to the present disclosure includes a light-condensing backlight unit; a liquid crystal panel transmitting light from the backlight unit; and a light scattering film converting light received at a light receiving surface into scattering light therein and then outputting the scattering light outside from a light output surface. The light scattering film includes a functional layer formed of a light-transmissive composition including an organic polymer compound and light scattering particles. The functional layer includes a first surface receiving the light and a second surface from which the scattering light is output. The light scattering particles have an average particle size of 1.5 μm or larger. The functional layer includes a particle layer expanding along the first surface and concentrated in a direction perpendicular to the first surface. The particle layer is formed of light scattering particles having a content of 60% by volume or higher among the light scattering particles included in the functional layer. The backlight unit is structured such that light having a normalized luminance of 0.5 or higher, among the light to be incident on the liquid crystal panel, is incident at an angle of incidence in the range of 32° or smaller with respect to the liquid crystal panel. The light scattering film is structured such that the light from the backlight unit is transmitted from the first surface toward the second surface of the functional layer.

According to the present disclosure, the light scattering film scattering light from the liquid crystal panel is provided. Therefore, a wide viewing angle may be provided. In addition, the light-condensing backlight unit is used. Therefore, almost no light crosses the liquid crystal composition contained in the liquid crystal panel obliquely. As a result, neither the black luminance nor the color is changed almost at all between in the normal-direction view and in the oblique-direction view. Moreover, light scattering particles having a content of 60% by volume or higher among the light scattering particles having an average particle size of 1.5 μm or larger form a particle layer expanding along the first surface. Therefore, the changes in the black luminance and the color caused by the change in the polar angle are significantly suppressed at all the azimuths. Furthermore, the change in the color gamut caused by the change in the polar angle is significantly suppressed at all the azimuths. Therefore, the color reproducibility is high both in the normal-direction view and in the oblique-direction view.

In the liquid crystal display apparatus, it is preferred that a fraction of the light scattering particles that have a particle size of 1.5 μm or larger and 4.5 μm or smaller has a content of 60% by volume or higher and 96% by volume or lower with respect to the entirety of the light scattering particles included in the functional layer.

In the liquid crystal display apparatus, it is preferred that a fraction of the light scattering particles that have a particle size of 0.1 μm or larger and smaller than 1.5 μm has a content of 4% by volume or higher and 40% by volume or lower with respect to the entirety of the light scattering particles included in the functional layer.

In the liquid crystal display apparatus, it is preferred that the light scattering film has a thickness of 4 μm or greater and 220 μm or less. A reason for this is that if the light scattering film is too thin, the light is not diffused sufficiently, and if the light scattering film is too thick, the transmitted light may possibly be attenuated.

In the liquid crystal display apparatus, it is preferred that the light scattering particles included in the functional layer corresponding to 1 m² of the surface, of the light scattering film, that is in contact with the liquid crystal panel has a total volume of $4.5 \times 10^{-7}$ m³ or larger and $3.6 \times 10^{-6}$ m³ or smaller.

In the liquid crystal display apparatus, it is preferred that the light scattering particles are formed of at least one material selected from the group consisting of alumina, melamine resin and hollow silica.

In the liquid crystal display apparatus, it is preferred that the organic polymer compound is at least one selected from the group consisting of polymethylmethacrylate, polyvinylalcohol, polyvinylchloride, polycarbonate, polyethylene, polystyrene, polyamide, silicone, urea, epoxy, polypropylene, cellulose acetate, and polyvinylidenechloride.

In the liquid crystal display apparatus, it is preferred that a refractive index of the light scattering particles and a refractive index of the organic polymer compound have a difference of 0.15 or larger and 1.0 or smaller.

The functional layer may be formed on a main surface of a light-transmissive substrate film. The functional layer may include two or more layers stacked on each other.

In the liquid crystal display apparatus, it is preferred that the backlight unit is structured such that light having a normalized luminance of 0.5 or higher, among the light to be incident on the liquid crystal panel, is incident at an angle of incidence in the range of 32° or smaller with respect to the liquid crystal panel. The light output from such a backlight unit does not cross the liquid crystal composition obliquely almost at all, and therefore, does not change the black luminance or the color.

It is preferred that the display mode of the liquid crystal display apparatus is the VA system.

A light scattering film according to the present disclosure converts light received at a light receiving surface into scattering light therein and then outputs the scattering light outside from a light output surface. The light scattering film includes a functional layer formed of a light-transmissive composition including an organic polymer compound and light scattering particles. The functional layer includes a first surface receiving the light and a second surface from which the scattering light is output. The light scattering particles have an average particle size of 1.5 μm or larger. The functional layer includes a particle layer formed of light scattering particles having a content of 60% by volume or higher among the light scattering particles, the particle layer expanding along the first surface and being concentrated in a direction perpendicular to the first surface.

According to the present disclosure, a liquid crystal display apparatus having a wide viewing angle and suppressing the changes in the black luminance and the color caused by the change in the polar angle may be easily provided. According to this embodiment, a liquid crystal display apparatus providing a high color reproducibility in the "normal-direction view" and also in the "oblique-direction view" may be easily provided. In the light scattering film according to the present disclosure, the function of suppressing the changes in the black luminance and the color caused by the change in the polar angle is not spoiled even in the case where the azimuth is changed.

REFERENCE SIGNS LIST 1 backlight unit
2 liquid crystal panel
21 first substrate plate
22 liquid crystal layer
23 second substrate plate
3 light scattering film
30 functional layer
31 light scattering particles
32 organic polymer compound

The invention claimed is:

1. An optical stack comprising:
   a light scattering film converting light received at a light receiving surface into scattering light therein and then outputting the scattering light from a light output surface; and
   a sheet provided on a light output surface side of the light scattering film, wherein
   the light scattering film comprises:
       a functional layer formed of a light-transmissive composition including an organic polymer compound and light scattering particles,
   wherein the functional layer comprises a first surface receiving the light and a second surface from which the scattering light is output,
   wherein the light scattering particles have an average particle size of 1.5 μm or larger,
   wherein the functional layer further comprises a particle layer formed of light scattering particles having a content of 60% by volume or higher among the light scattering particles, the particle layer expanding along the first surface and being concentrated in a direction perpendicular to the first surface,
   wherein the light scattering film is structured such that in a case that light having a normalized luminance of 0.5 or higher is incident on the first surface at an angle of incidence in a range of −32° to +32° with respect to the first surface, light having a normalized luminance of 0.33, among light to be output from the second surface, is output from the second surface at an angle of output in a range of −60° to −35° or +35° to +60° with respect to the second surface.

2. The optical stack of claim 1, wherein a fraction of the light scattering particles, that have a particle size of 1.5 μm or larger and 4.5 μm or smaller, has a content of 60% by volume or higher and 96% by volume or lower with respect to an entirety of the light scattering particles included in the functional layer.

3. The optical stack of claim 1, wherein a fraction of the light scattering particles, that have a particle size of 0.1 μm or larger and smaller than 1.5 μm, has a content of 4% by volume or higher and 40% by volume or lower with respect to an entirety of the light scattering particles included in the functional layer.

4. The optical stack of claim 1, wherein the light scattering film has a thickness of 4 μm or more and 220 μm or less.

5. The optical stack of claim 1, wherein the light scattering particles included in the functional layer corresponding to 1 m² of the first surface has a total volume of $4.5 \times 10^{-7}$ m³ larger and $3.6 \times 10^{-6}$ m³ or smaller.

6. The optical stack of claim 1, wherein the light scattering particles are formed of at least one material selected from a group consisting of alumina, melamine resin, and hollow silica.

7. The optical stack of claim 6, wherein the organic polymer compound is at least one selected from a group consisting of polymethylmethacrylate, polyvinylalcohol, polyvinylchloride, polycarbonate, polyethylene, polystyrene, polyamide, silicone, urea, epoxy, polypropylene, cellulose acetate, and polyvinylidenechloride.

8. The optical stack of claim 1, wherein a refractive index of the light scattering particles and a refractive index of the organic polymer compound have a difference of 0.15 or larger and 1.0 or smaller.

9. The optical stack of claim 1, wherein the light scattering film is formed of the functional layer scattering light isotropically.

10. The optical stack of claim 9, wherein the sheet comprises a polarizing plate including a dye layer containing a dye in an oriented state, and
wherein the functional layer is directly bonded to the dye layer.

11. A liquid crystal display apparatus, comprising:
a light-condensing backlight unit;
a liquid crystal panel transmitting light from the light-condensing backlight unit; and
the optical stack of claim 1,
wherein the light-condensing backlight unit is structured such that light having a normalized luminance of 0.5 or higher, among the light to be incident on the liquid crystal panel, is incident at an angle of incidence in a range of 32° or smaller with respect to the liquid crystal panel, and
wherein the light scattering film is further structured such that the light from the light-condensing backlight unit is transmitted from the first surface toward the second surface of the functional layer.

12. The liquid crystal display apparatus of claim 11,
wherein the light scattering film further comprises a substrate bonded to the liquid crystal panel, and
wherein the substrate is a light-transmissive film formed of a polymer having high birefringence.

13. The liquid crystal display apparatus of claim 11,
wherein the sheet includes a transmitted light selecting layer preventing transmission of light in a specific wavelength range included in the light from the liquid crystal panel.

14. The liquid crystal display apparatus of claim 11, wherein no component that scatters light anisotropically is provided closer to a viewer than the liquid crystal panel.

* * * * *